(No Model.)
W. A. FRANK & T. WICKS.
JOURNAL BEARING.
No. 352,685. Patented Nov. 16, 1886.
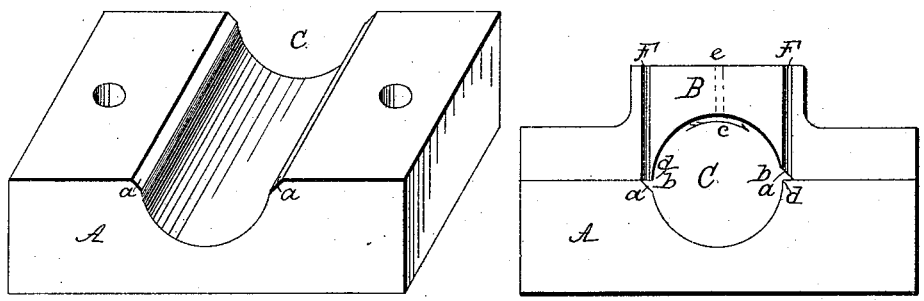
Witnesses
S. E. E. Stevens
P. C. Stevens
Inventors
William A. Frank.
Thomas Wicks.
By their Attorney W. X. Stevens.

UNITED STATES PATENT OFFICE.

WILLIAM A. FRANK AND THOMAS WICKS, OF PINAL, ARIZONA TERRITORY.

JOURNAL-BEARING.

SPECIFICATION forming part of Letters Patent No. 352,685, dated November 16, 1886.

Application filed June 15, 1886. Serial No. 205,215. (No model.)

*To all whom it may concern:*

Be it known that we, WILLIAM A. FRANK and THOMAS WICKS, citizens of the United States, residing at Pinal, in the county of Pinal and Territory of Arizona, have invented certain new and useful Improvements in Journal-Bearings; and we do hereby declare the following to be a full, clear, and exact description of the invention, such as will enable others skilled in the art to which it appertains to make and use the same.

This invention relates to that class of devices which are designed to distribute oil in journal-bearings.

It is a fact well known to the operators of machinery that in that class of journal-bearings provided with removable caps the oil works out from the bearing at the parting of the box and cap, however tight the joint may be. In the class of machinery with which we are acquainted in mining the caps of the bearings are quite loose, leaving an open joint, and we have observed that for some time after cleaning these joints the bearing does not heat so quickly as when the joints are filled with dirt. We therefore conclude that so long as the lubricant remains fluid in the joint it floats particles of dirt and fine grit out from the bearing; but when so much dirt gathers in the joint that it dries in a cake along the bearing it closes the latter, and then the grit, having no escape from the bearing, produces friction and heat. Now, if the bearing can be kept lubricated along the cap and box joint, the grit will continue to work out; and the object of the invention is to provide means whereby oil, thick grease, or any other suitable lubricant may be distributed automatically throughout the length of journal-bearings.

To this end the invention consists in grooves formed in bearings, as hereinafter described and claimed, reference being had to the accompanying drawings, in which—

Figure 1 is a perspective view of the lower half of a journal-bearing, showing our invention. Fig. 2 is a transverse section of a complete bearing.

A represents the lower half of the bearing, B the upper half or cap, and C the bore in which the journal is designed to revolve.

In constructing this bearing we form grooves $b$ therein longitudinally with the shaft. These grooves are most economically formed by casting slanting faces $a$ at the parting of the bearing; but they may be formed in bearings already made by cutting away the corners and leaving the slanting face $a$, and thus forming groove $b$. When the journal is to revolve in only one direction, as shown by the arrow $c$, the best result is produced by leaving the corners $d$ full, as shown in Fig. 2, and cutting or casting the adjacent corners $a$ slanting. The sharp corner $d$ has a tendency to scrape away from the journal any grit or other foreign substance which might otherwise cut creases and rapidly wear away both the journal and bearing, and to hold the said foreign substance in the groove, where it may be readily cleaned away by removing the cap or upper half of the bearing; but the main service of these grooves is to gather the oil, which is generally poured in at a single central oil-hole, $e$, at the top of the bearing as it comes around on the journal, and flow it each way toward the ends of the bearing until all parts are equally oiled. The kind of oil or grease used makes no difference with this device.

To make our oil-distributers more complete we form oil-holes F through the cap of the bearing directly into the grooves. By this means of introducing fresh oil directly into the groove at the cap-joint all grit and gummy matter may be dissolved and forced out at the end of the bearing and through the parting without the trouble of removing the cap.

If the hole F be dispensed with and oil be introduced at the usual point through hole $e$ in the cap, the oil-grooves $b$ will accumulate the oil and grit, which will work out at the parting for a much longer time before clogging the parting than if there were no groove at the joint to hold a body of oil. If oil be introduced to the bearing at any point, it will be gathered and distributed along the bearing by these grooves, and will continue to be used over and over by the journal, while the grit scraped from the journal will continually crowd back into the joint and escape therefrom.

What we claim as our invention, and desire to secure by Letters Patent, is—

The combination, in a journal-bearing, of a body-piece constituting one half of the bearing and a cap therefor constituting the other half of the bearing, the said cap and body being formed with oil-grooves along the bearing at their joint and provided with an oil-hole, substantially as shown and described.

In testimony whereof we affix our signatures in presence of two witnesses.

WILLIAM A. FRANK.
THOMAS WICKS.

Witnesses:
JOHN SHERWOOD,
J. D. REYMERT.